(No Model.)
E. HEATH.
POKE.
No. 397,079. Patented Jan. 29, 1889.
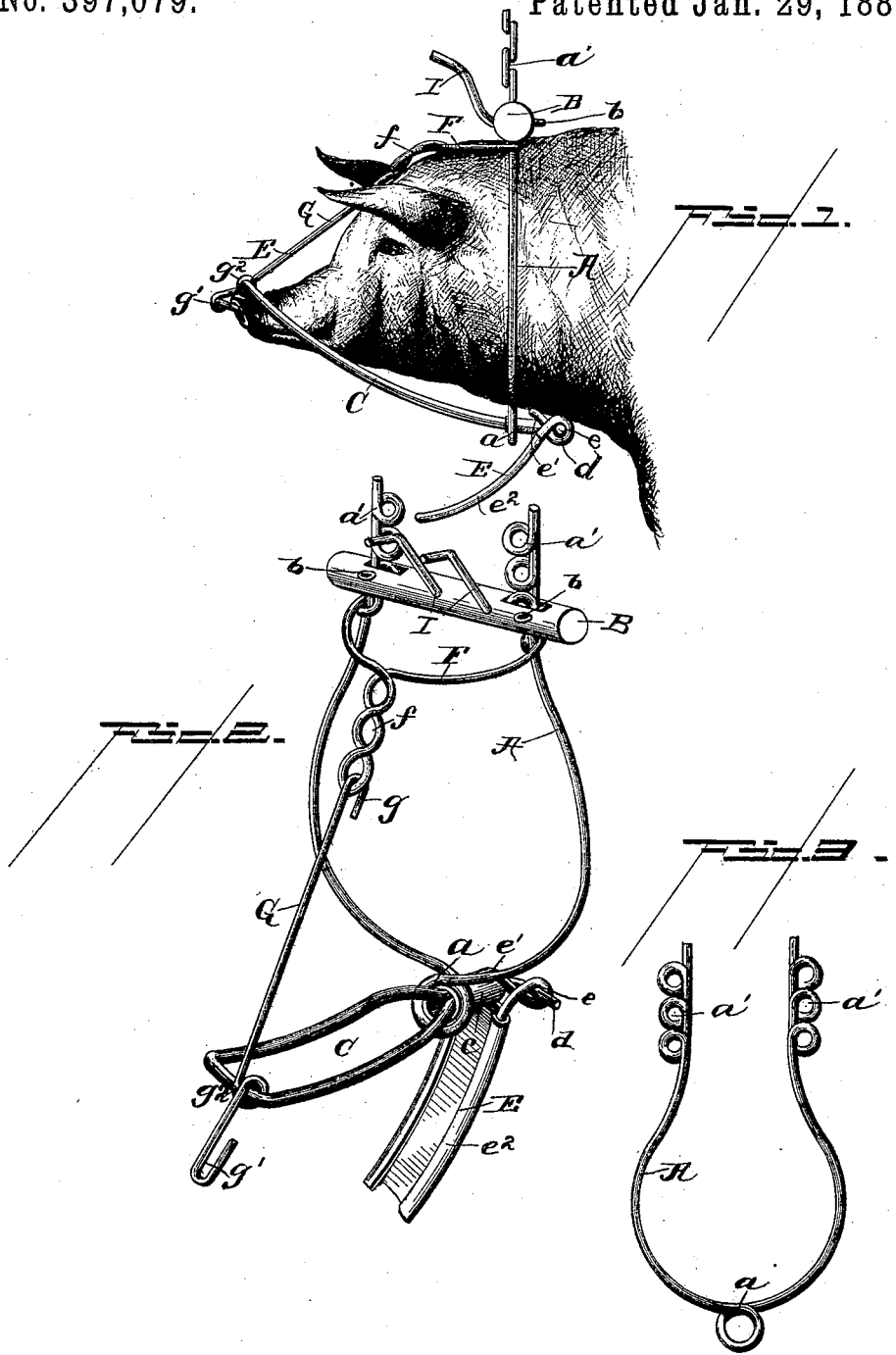
WITNESSES
M. H. Pumphrey.
Van Buren Hillyard.
INVENTOR
Emery Heath
By R. S. & A. P. Lacey
Attorneys

UNITED STATES PATENT OFFICE.

EMERY HEATH, OF CURTIS, NEBRASKA, ASSIGNOR OF ONE-HALF TO
WALTER H. CRABB, OF SAME PLACE.

POKE.

SPECIFICATION forming part of Letters Patent No. 397,079, dated January 29, 1889.

Application filed August 25, 1888. Serial No. 283,762. (No model.)

*To all whom it may concern:*

Be it known that I, EMERY HEATH, a citizen of the United States, residing at Curtis, in the county of Frontier and State of Nebraska, have invented certain new and useful Improvements in Hog-Controllers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device to prevent hogs from leaving an inclosure which is fenced in with only a single wire.

The improvement consists of the novel features which hereinafter will be more fully described and claimed.

In the drawings, Figure 1 is a side view of the device, showing it in position; Fig. 2, a perspective view of the device, and Fig. 3 a front view of the bow.

The bow A, having the eye $a$ at its lower end and the series of eyes $a'$ at the upper ends of its vertical branches, is composed of stout wire or light bar metal, the eyes $a$ and $a'$ being formed by coils in the said wire or bar. The neck-yoke B, of wood, is apertured to receive the ends of the bow, being adjustably held to the bow by the pins $b$, which pass through the yoke and through any one of the series of eyes $a'$ of the bow. The nose-band C has its rear ends brought close together and held by the clip $c$, which ends are bent out laterally in diametrically-opposite directions to form the arms $d$, which serve as supports for the hook E. The contracted portion of the band C passes through the eye $a$ of the bow. The bracket F, having its ends secured to the bow just beneath the yoke, has a series of eyes, $f$. The rod G, having the hook $g$ at its upper end and the hook $g'$ at its lower end, is connected with the nose-band C at $g^2$, and has its upper end adjustably connected with the bracket F by having the hook $g$ fitted in one of the eyes $f$. The lower end of the rod F is fastened to the ring in the nose of the animal.

The hook E has eyes $e$, which receive the arms $d$ of the nose-band, and a loop, $e'$, which passes over the contracted portion of the nose-band and limits the movement of the said hook. The hook is composed of wire bent in the form shown, the ends of the wire being held together by the clip $e^2$. The bow fits about the neck of the animal, and the yoke rests on the neck of the animal and binds the ends of the bow together, the bow being adjustable in the yoke to adapt the device to different-sized animals. The nose-band encircles the nose, and is adjustably supported at its front end by the rod G, which is adjustably connected with the bracket F. When the animal attempts to go under the fence-wire, the hooks I, projecting from the yoke B, engage with the said wire and prevent it accomplishing its purpose, and when it endeavors to pass over the said fence-wire the hook E, engaging therewith, prevents its efforts in this direction proving successful. The hook E, by reason of its inclined position and its pivotal connection with the nose-band, folds up when the animal is in a recumbent position.

Having thus described my invention, what I claim, and desire to secure by Letters Patent, is—

1. The herein-described device for preventing stock leaving an inclosure, composed of the bow, the neck-yoke, the hooks I, the nose-band connected at its rear with the bow, the hook E, and the connection between the front end of the said nose-band and the upper end of the bow, substantially as described.

2. The combination, with the bow having an eye, $a$, at its lower end, of the nose-band having its rear end supported in said eye $a$ and provided with a hook, and the rod connected with the front end of the nose-band between its ends, the upper end of the rod having connection with the upper end of the bow, and the lower end of the rod provided with a hook, substantially as and for the purpose described.

3. In a hog-controller, the combination, with the nose-band having lateral arms $d$, of the hook E, journaled on the arms $d$, and provided with the loop $e'$, to limit the movement of the hook, substantially as described.

4. The combination, with the bow having the eye $a$ at its lower end and having the series of eyes $a'$ at the upper ends of its branches, and the yoke adjustably connected with the bow, of the nose-band supported at its rear in the eyes $a$ and having a hook, the bracket F, and the rod G, connected with the front end of the nose-band and having its upper end adjustably connected with the said bracket and having its lower end provided with a hook, substantially as described.

5. The herein-described hog-controller, composed of the bow having the eyes $a$ and $a'$, the yoke adjustably connected with the bow and having the hooks I, the bracket F, the nose-band supported in the eye $a$ at its rear end and having the arms $d$, the rod G, connected with the front end of the nose-band and having its upper end adjustably connected with the bracket F and having its lower end provided with a hook, and the hook E, having the eyes $e$, which receive the arms $d$, and the loop $e'$, which passes over the rear end of the nose-band, substantially as set forth.

In testimony whereof I affix my signature in presence of two witnesses.

EMERY HEATH.

Witnesses:
 A. G. HAGADORN,
 V. E. DURLIN.